(12) United States Patent
Hoffmann et al.

(10) Patent No.: US 7,431,002 B2
(45) Date of Patent: Oct. 7, 2008

(54) CAMSHAFT WITH CONTRAROTATING CAMS FOR AUTOMOTIVE ENGINES IN PARTICULAR

(75) Inventors: Hermann Hoffmann, Stuttgart (DE); Martin Lechner, Lindlar/Frielingsdorf (DE); Falk Schneider, Münchingen (DE)

(73) Assignee: MAHLE International GmbH, Stuttgart (DE)

( * ) Notice: Subject to any disclaimer, the term of this patent is extended or adjusted under 35 U.S.C. 154(b) by 422 days.

(21) Appl. No.: 11/342,930

(22) Filed: Jan. 30, 2006

(65) Prior Publication Data
US 2006/0174724 A1 Aug. 10, 2006

(30) Foreign Application Priority Data
Feb. 4, 2005 (DE) .................. 10 2005 004 976

(51) Int. Cl.
*F01L 1/04* (2006.01)
(52) U.S. Cl. ................ 123/90.6; 123/90.27; 123/90.31; 29/888.1
(58) Field of Classification Search ............... 123/90.6
See application file for complete search history.

(56) References Cited

U.S. PATENT DOCUMENTS 5,404,770 A * 4/1995 Kruger ..................... 74/568 R
5,431,131 A * 7/1995 Kuhn et al. ................ 123/90.6
5,809,954 A 9/1998 Devine et al.
7,284,521 B2 * 10/2007 Lechner et al. ............ 123/90.6

FOREIGN PATENT DOCUMENTS

| DE | 27 47 884 | 5/1979 |
|----|-----------|--------|
| DE | 32 12 663 A1 | 10/1983 |
| DE | 36 24 827 A1 | 2/1988 |
| DE | 39 33 923 A1 | 4/1991 |
| DE | 39 43 426 C1 | 4/1991 |
| DE | 42 22 477 A1 | 2/1993 |
| DE | 44 01 011 A1 | 7/1994 |
| DE | 43 06 621 A1 | 9/1994 |
| DE | 93 20 451 | 10/1994 |
| EP | 0 643 200 A1 | 3/1995 |
| EP | 1 362 986 A1 | 11/2003 |
| JP | 8 270418 | 8/1996 |
| WO | WO 99/35373 | 7/1999 |

* cited by examiner

*Primary Examiner*—Thomas Denion
*Assistant Examiner*—Kyle M Riddle
(74) *Attorney, Agent, or Firm*—Collard & Roe, P.C.

(57) ABSTRACT

A camshaft has contrarotating cams for automotive engines, in which an inside shaft and an outside shaft are arranged concentrically so they are contrarotating, at least one cam has at least one main cam element that can be placed radially on the outside shaft and is supported there so it can rotate. The main cam element is connected to the inside shaft in a manner that is rotationally locked via a fastener passing through a recess in the outside shaft. Further features include a fastener, a main cam element and a locking means. The fastening of the main cam element to the inside shaft is provided by widening the outside diameter of the fastener by the locking means with a resulting tightly seated connection between the fastener and the inside shaft, and the fastener and the locking means.

9 Claims, 12 Drawing Sheets

CAMSHAFT WITH CONTRAROTATING CAMS FOR AUTOMOTIVE ENGINES IN PARTICULAR

CROSS REFERENCE TO RELATED APPLICATIONS

Applicants claim priority under 35 U.S.C. §119 of German Application No. DE 10 2005 004 976.1 filed Feb. 4, 2005.

The present invention relates to a camshaft according to the preamble of patent Claim 1.

Such a camshaft is known from DE 39 33 923 A1, for example. With this camshaft, the rotatable cam element is fixedly connected to the inside shaft via a receptacle bore provided there to receive the fastening means via a fastening means integrally molded in the form of a rod radially on the cam element and connected by means of a press fit. Producing this press fit can lead to bending of the axle of the inside shaft with respect to the outside shaft, which can impair the functional capacity of the adjustable camshaft in that the inside shaft is then no longer rotatable with respect to the outside shaft without jamming.

EP 1362986 A1 describes a generic camshaft having mutually adjustable cams in which the adjustable cam is connected to the inside shaft via a hollow pin through a borehole provided in the inside shaft. The tight fit required between hollow fastening pin and the inside shaft is achieved by means of a pin pressed into the cavity of the hollow pin, thereby widening the outside circumference of the hollow pin. Through special measures in manufacturing such a camshaft, deformation of the inside shaft, which might lead to jamming between the inside shaft and the outside shaft, can be prevented absolutely reliably. However, these measures represent a complication that is to be avoided, especially for cost reasons, while nevertheless permitting reliable assembly.

The present invention relates to the problem of joining a constructed camshaft to adjustable cams made of components that have preferably already been completely machined in a simple and economical manner to form a generic camshaft that functions absolutely reliably.

This problem is solved primarily by an embodiment of a generic camshaft according to the characterizing features of patent Claim 1.

Advantageous and expedient embodiments are the object of the subordinate claims.

This invention is based on the general idea of attaching an adjustable cam and/or cam elements that are limited only to the circumference, placing them radially on a camshaft and fastening them to the inside shaft without transferring any forces with respect to the concentric shafts that would interfere with its function. The fastening means are designed according to this invention so that they can be installed with mutual support, so that no joining forces can act in the radial direction to the axis of the concentric shafts of the camshaft.

Various embodiments characterized in the claims are possible here alternatively and cumulatively.

In many cases, it is already sufficient that a rotatable cam consists only of a single segment which comprises only a partial circumference of the camshaft. In these cases, the cam may consist of an element that surrounds the outside shaft by max. 180°, at least in the inside contact area, so that it is just large enough to be pushed radially onto the shaft. This cam element may have outside areas protruding outward more than 180° in its circumferential end areas. The limitation to a circumferential angle of 180° is thus based only on the inside circumference of the cam element, so that it can be placed radially onto the outside shaft.

In cases in which a rotating cam profile, i.e., a cam profile having a base circle area, is desired, such a cam may be composed of to two halves and/or individual elements, each half being inserted from opposite sides of the camshaft. It is thus also possible to design the base circle area through rings placed axially on the outside shaft next to the cam element.

The connection between the various fastening means and to the inside shaft in particular may be accomplished by press-fitting and form-fitting contact seating and/or by soldering, welding and gluing. For a form-fitting connection, screw means and/or rivet means may be used.

Especially advantageous exemplary embodiments that are explained in greater detail below are illustrated in the drawing by means of a cross section through a cam fastening area.

They show:

FIG. 1 the connection of a main cam element via a hollow pin to a dowel pin inserted into it, FIG. 2 an embodiment according to FIG. 1 in which the dowel pin is provided with a stop head, FIG. 3 an embodiment according to FIG. 1 or 2 in which a screw is used instead of a dowel pin, FIG. 4 an embodiment according to FIG. 3 in which the main cam element is designed to be asymmetrical in comparison with the fastening axis, FIG. 5 an embodiment according to FIG. 1 in which the dowel pin is connected to a supplementary cam element, FIG. 6 the embodiment according to FIG. 5 in a completely installed state with a cam consists of two individual elements with a closed outer cam surface, FIG. 7 an embodiment according to FIG. 5 and FIG. 6 in which the two cam elements which are assembled to make a complete cam are produced from a closed cam by cracking, FIG. 8 the embodiment according to FIG. 7 in an assembled state, FIG. 9 a cam composed of two parts in which the dowel pin is in form-fitting connection with the supplementary cam element, FIG. 10 an embodiment according to FIG. 9 with a different design of the stop head of the dowel pin, FIG. 11 an embodiment according to FIGS. 9, 10 with a dowel pin screwed in, FIG. 12 an embodiment according to FIG. 1 with two rings attached next to the main cam element for designing a cam base circle area.

The drawing shows only one section through a connecting area of a rotatable cam and/or a main cam element and optionally a supplementary cam element of a camshaft. In such a camshaft, several adjustable cams and non-adjustable cams are present at the same time.

The camshaft includes two concentric contrarotating shafts, namely an inside shaft 1 and an outside shaft 2.

A rotatable shaft and/or a main cam element 3 is supported with a circular inside circumferential surface 4 on the outside circumference of the outside shaft 2. In all embodiments, the main cam element 3 is connected at least in a rotationally fixed manner to the inside shaft 1.

The individual embodiments of various types of fastening and various shapes and/or compositions of main cam elements 3 and supplementary cam elements 12 are described in greater detail below with reference to the individual figures.

Figure 1:
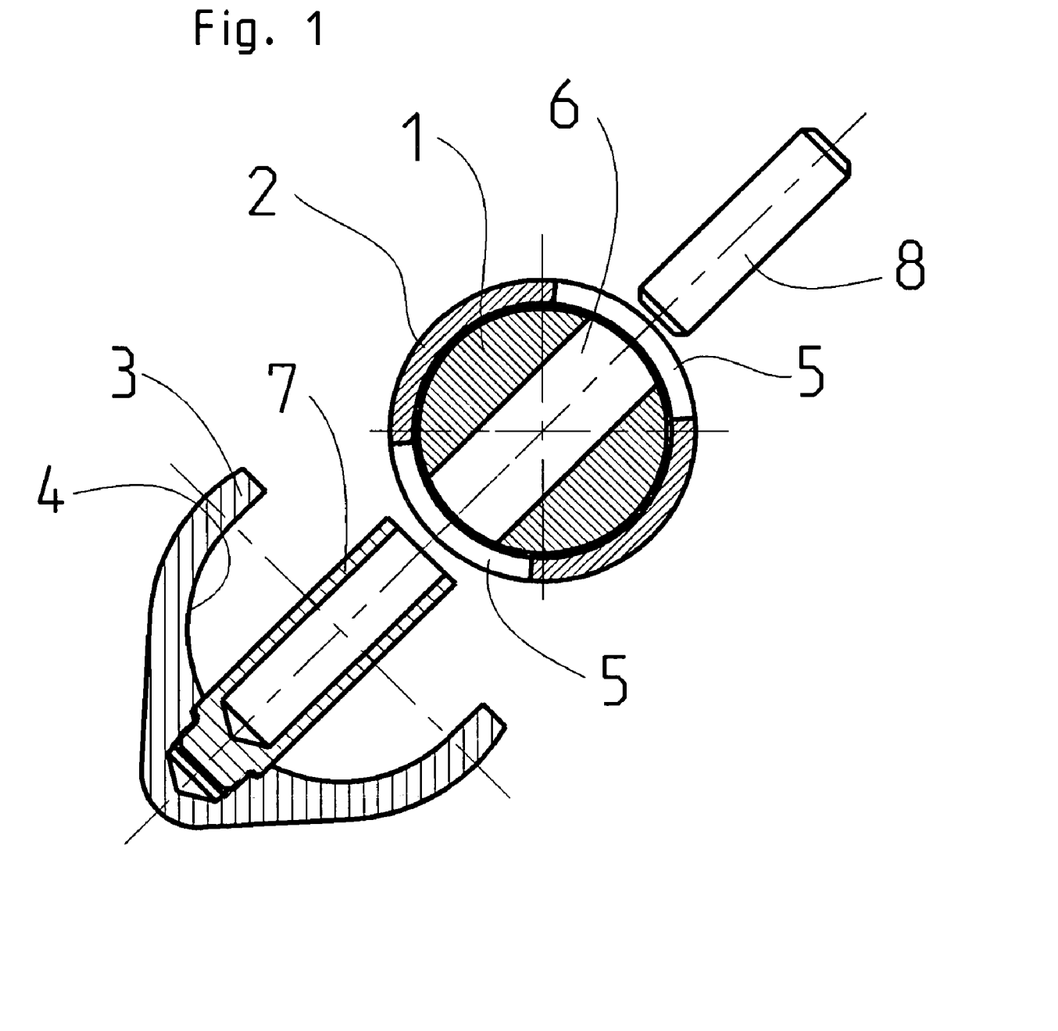

Embodiment According to FIG. 1

The main cam element 3 has an inside circumferential surface 4 which is limited in the circumferential direction to an angle of max. 180° with a circular curvature. A circumferential area going beyond 180° does not have any inside circumferential surfaces that come in contact with the outside circumference of the outside shaft 2. Otherwise the main cam element 3 could not be mounted radially to the shaft axis.

Recesses 5 in the form of elongated holes, assigned to a through-bore 6 in the inside shaft 1, are provided in the outside shaft 2.

For fastening the main cam element 3, a fastening means 7 fixedly connected to the former is designed with a hollow free end area. This hollow fastening means 7 is inserted into a type of sliding fit without applying force for the purpose of fastening it to the inside shaft 1 in the through-bore 6 therein. A dowel pin is pressed from the other side into the opening of the hollow fastening means 7 to serve as a closing means 8. The force to be applied to press it into the opening acts on the inside shaft 1 in the direction radially to the through-bore 6. That means that due to the forces to be applied for the fastening operation, no axial force component acts on the concentric shafts, namely the inside shaft 1 and the outside shaft 2 which could cause the shafts to bend in relation to one another.

The cam element 3 must be joined in such a way that a sufficient amount of play for rotation of the cam element 3 on the outside shaft 2 is ensured between the inside circumferential surface 4 and the outside surface of the outside shaft 2.

Figure 2:
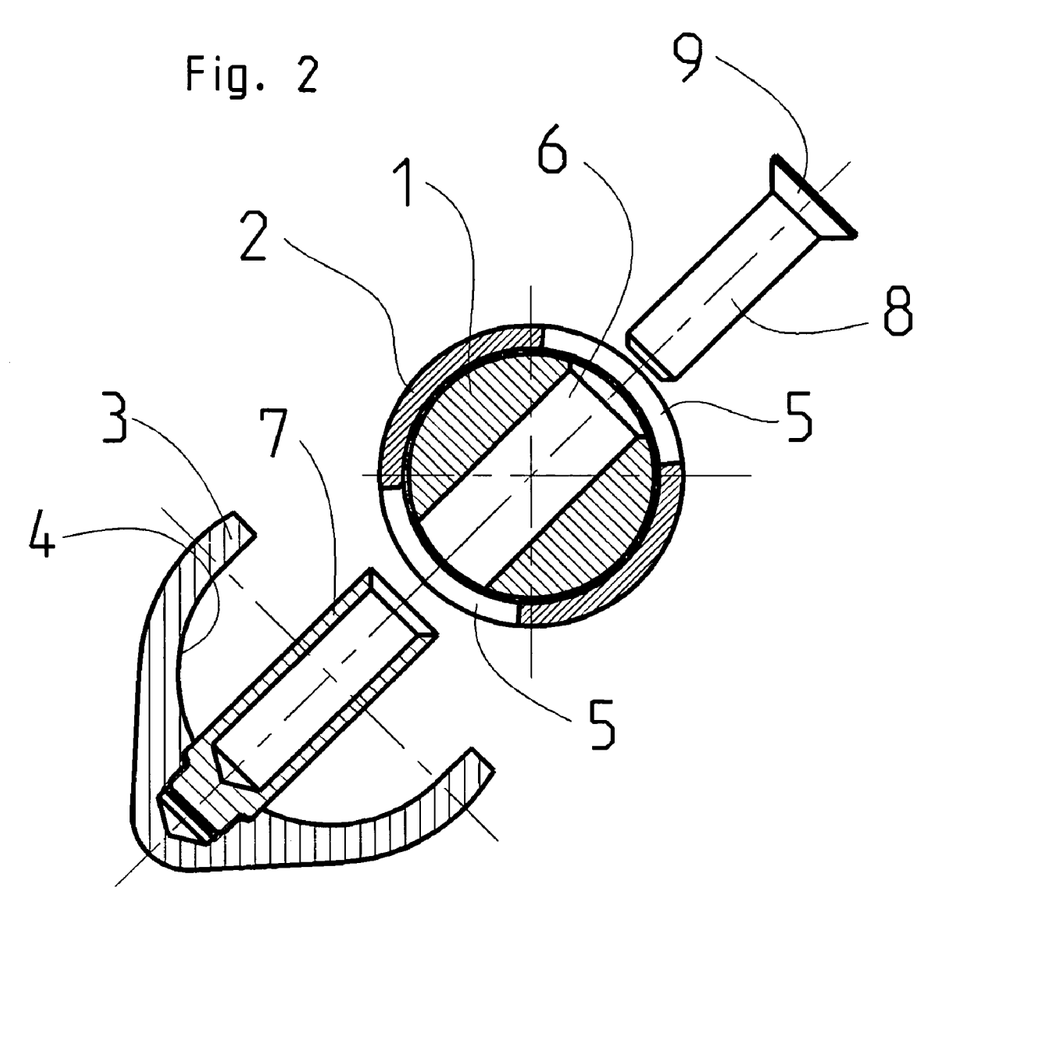

Embodiment According to FIG. 2

This embodiment differs from that according to FIG. 1 only in a different design of the dowel pin 8, which is provided here with a stop head 9 with which it rests in a form-fitting manner in the entrance area of the through-bore 6 of the inside shaft 1 in the installed state.

Figure 3:
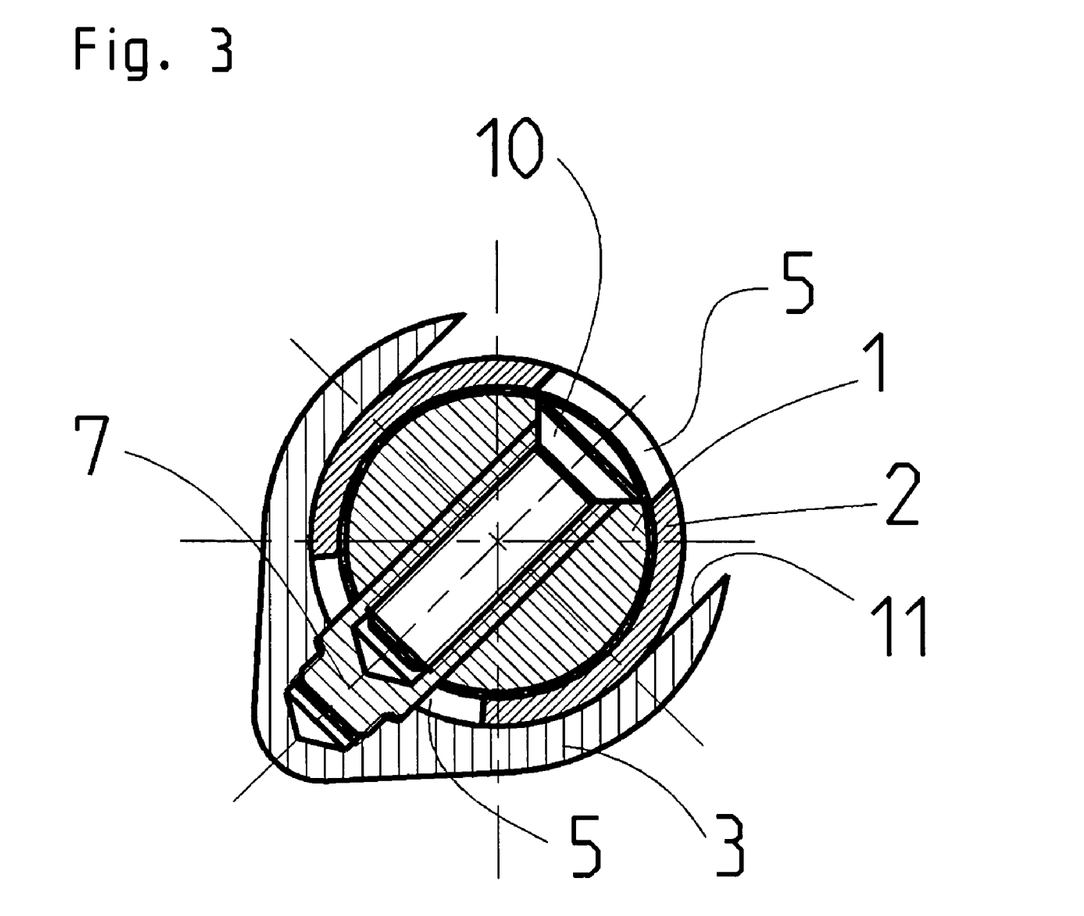

Embodiment According to FIG. 3

The dowel pin in the embodiment according to FIG. 2 is replaced here by a tension screw 10 that can be screwed into a threaded borehole provided within the fastening means 7. The tension screw 10 and the respective threaded borehole may be designed to have complementary conical designs. It is possible here to provide the thread in only one area facing the free end of the fastening means 7 while the other area is designed to be conical but without a thread. In such an embodiment, the threaded area may be designed as a circular cylindrical shape in the usual manner. It is then widened only in the conical area which must be inside the inside shaft 1 to be able to achieve the desired press fit there.

Radial recesses 11 permit an outer cam shaping going beyond 180° while the main cam element 3 can still be installed properly.

Figure 4:
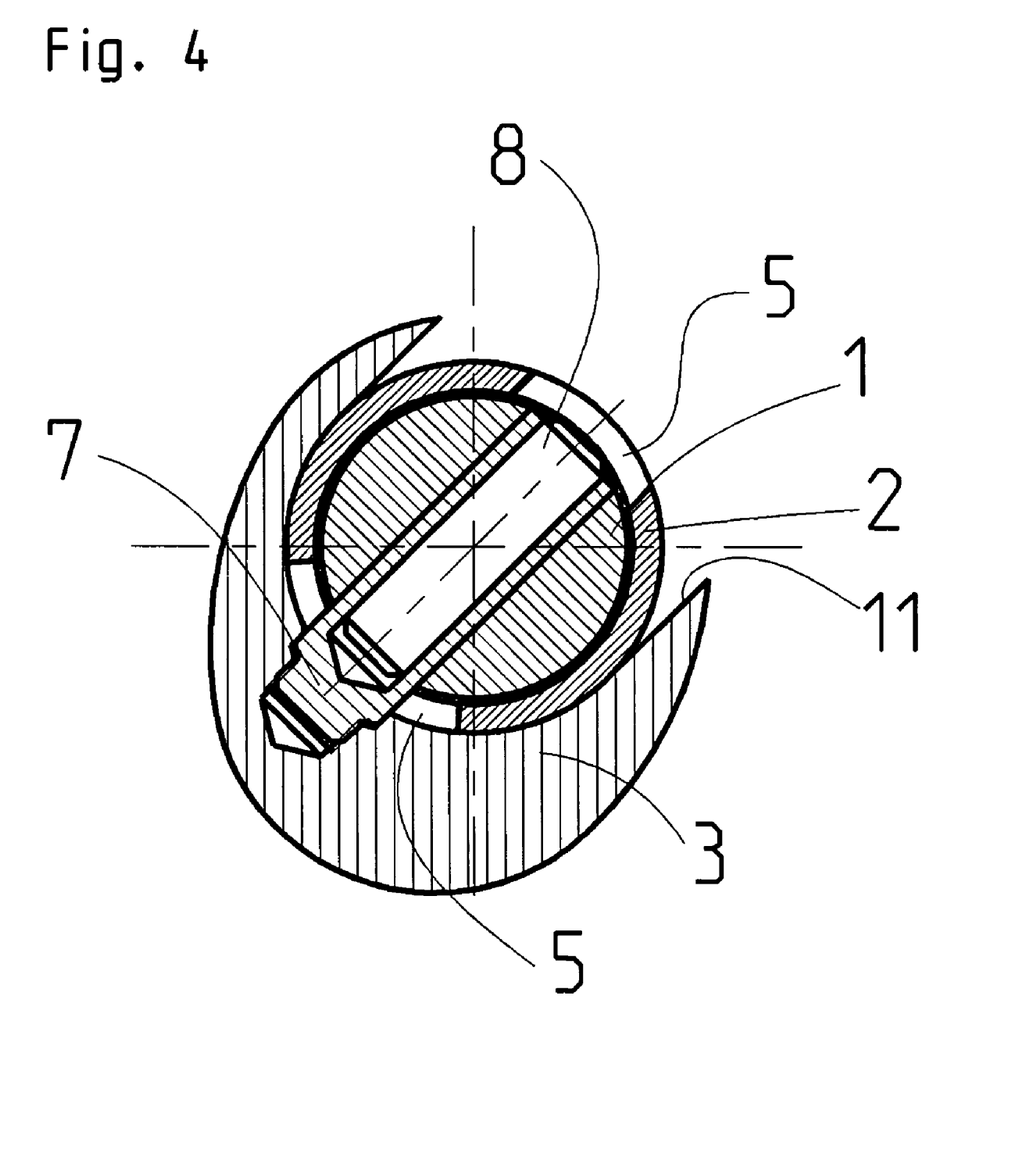

Embodiment According to FIG. 4

In this embodiment, a dowel pin 8 is inserted as a locking element into the embodiment according to FIG. 1. The dowel pin 8 in the installed state does not protrude beyond the outside surface of the inside shaft 1. Therefore, the respective recess 5 in the outside shaft 2 needs only a length that would permit installation of the dowel pin 8 in the circumferential direction. When the inside shaft 1 rotates with respect to the outside shaft 2, the dowel pin 8 remains inside the inside circumferential surface of the outside shaft 2, i.e., the size of the recess 5 is not relevant for the rotational movement of the inside shaft 1 in relation to the outside shaft 2.

In this embodiment, the main cam element 3 has an asymmetrical shape in relation to the axis of the fastening means 7.

Figure 5:
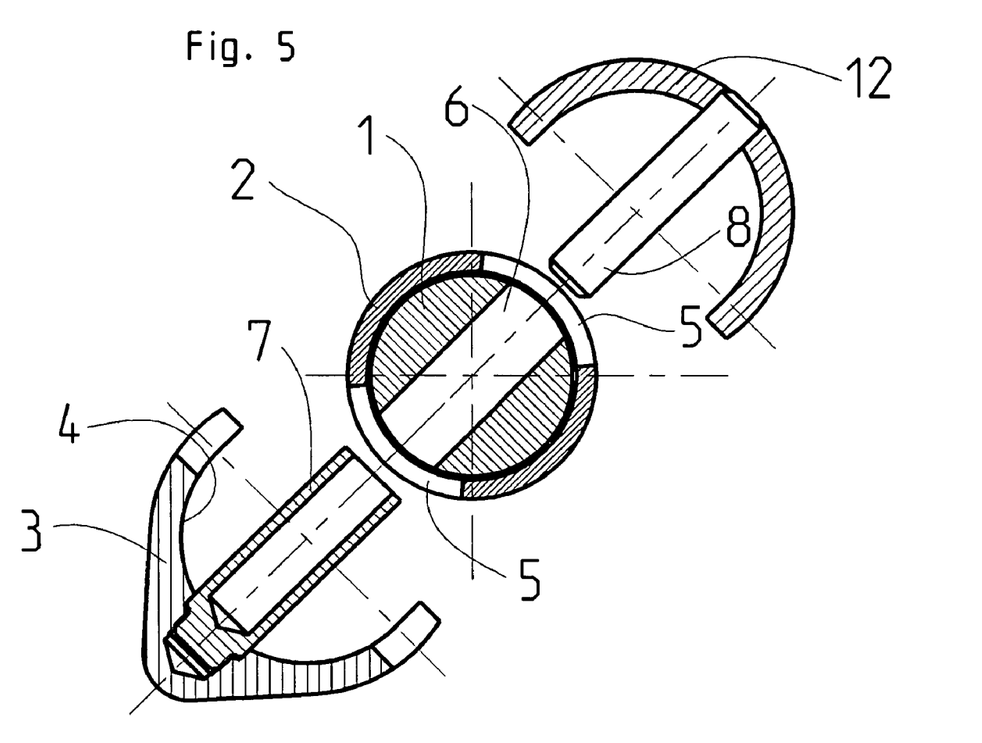
Figure 6:
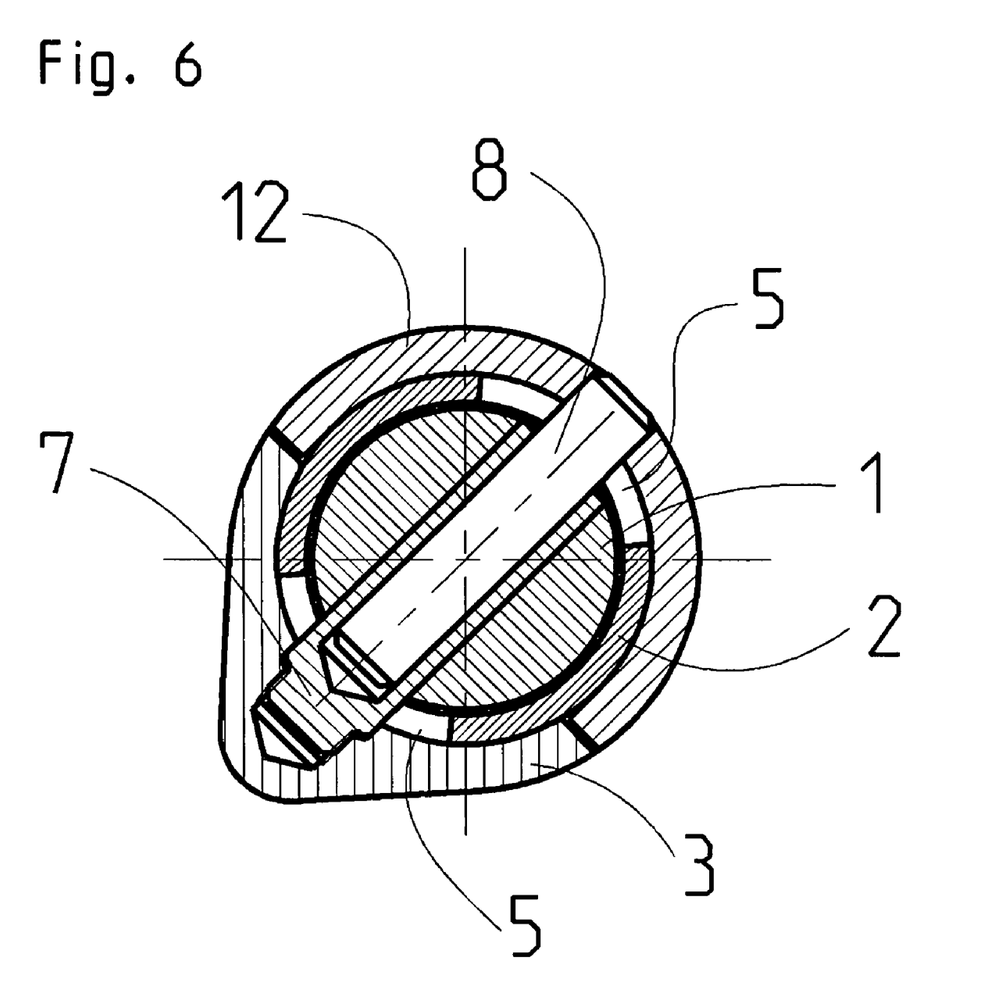

Embodiment According to FIGS. 5 and 6

This embodiment differs from the embodiment according to FIG. 1 in particular in that a supplementary cam element 12 is fixedly connected to the dowel pin 8 as a locking element. In the installed state of the main cam element 3 and the supplementary cam element 12, there is a cam having a base circle area consisting of two assembled elements that are closed on the circumference.

A tight fit between the fastening means 7 and the inside shaft 1 due to a radial widening of the fastening means 7 is possible but not necessary. This additional tight fit, i.e., a press fit, is not necessary if the main cam element 3 and the supplementary cam element 12 form a form-fitting connection such that a predetermined play in the movement is defined for the cam with respect to the outside shaft 2, where the cam is made up of the main cam 3 and the supplementary cam 12.

Figure 7:
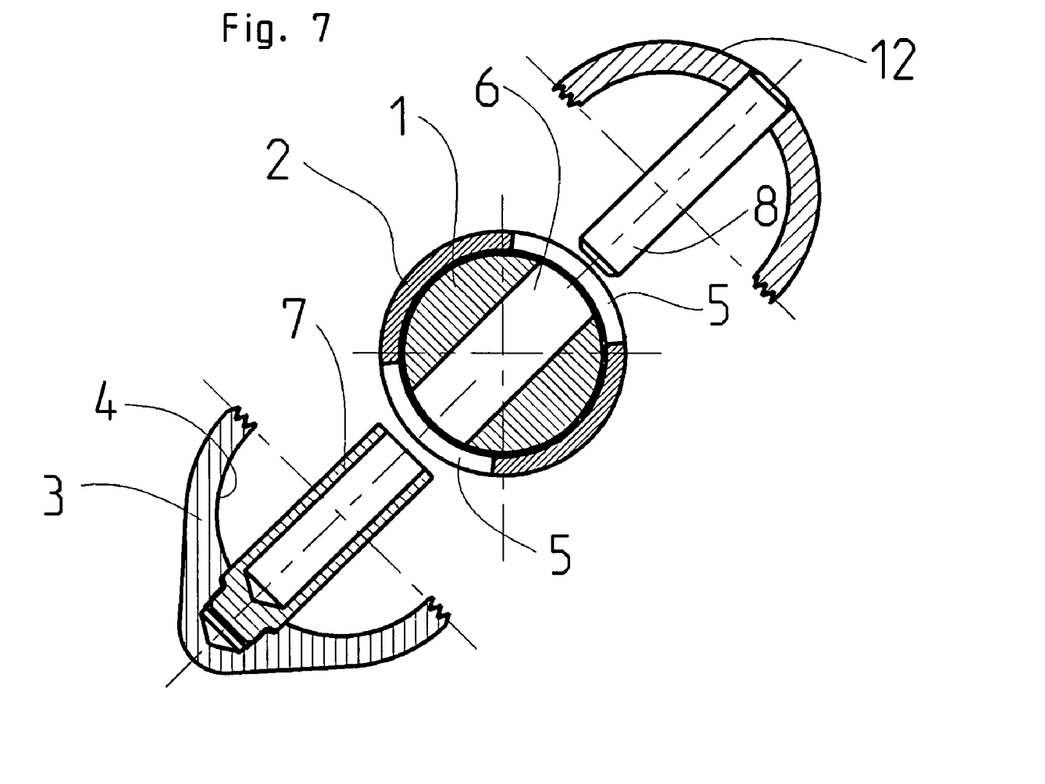
Figure 8:
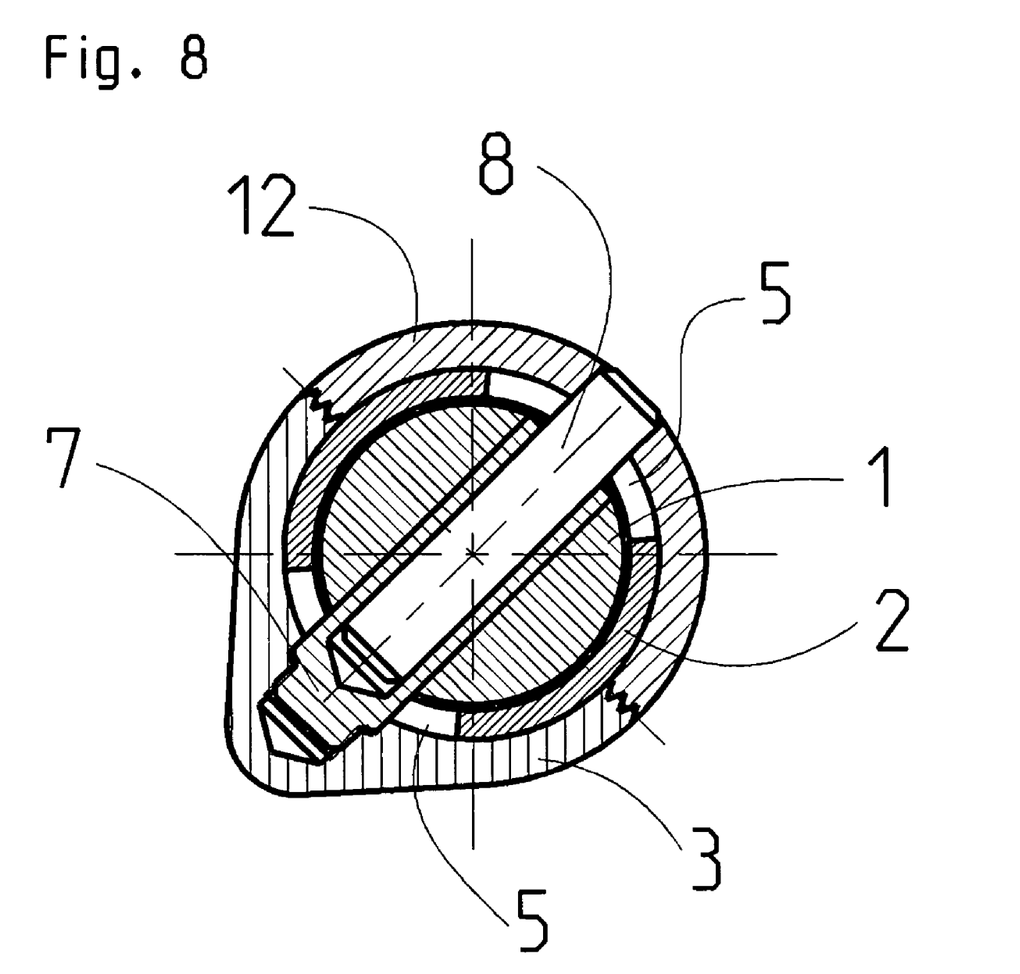

Embodiment According to FIGS. 7 and 8

This embodiment differs from embodiments according to FIGS. 5 and 6 only in that the main cam element 3 and the supplementary cam element 12 have been produced by cracking a cam that was initially manufactured as a closed cam. To accomplish this cracking, the cam, which is manufactured as a closed cam, is provided with notches in the cracking areas that trigger the cracking process.

Figure 9:
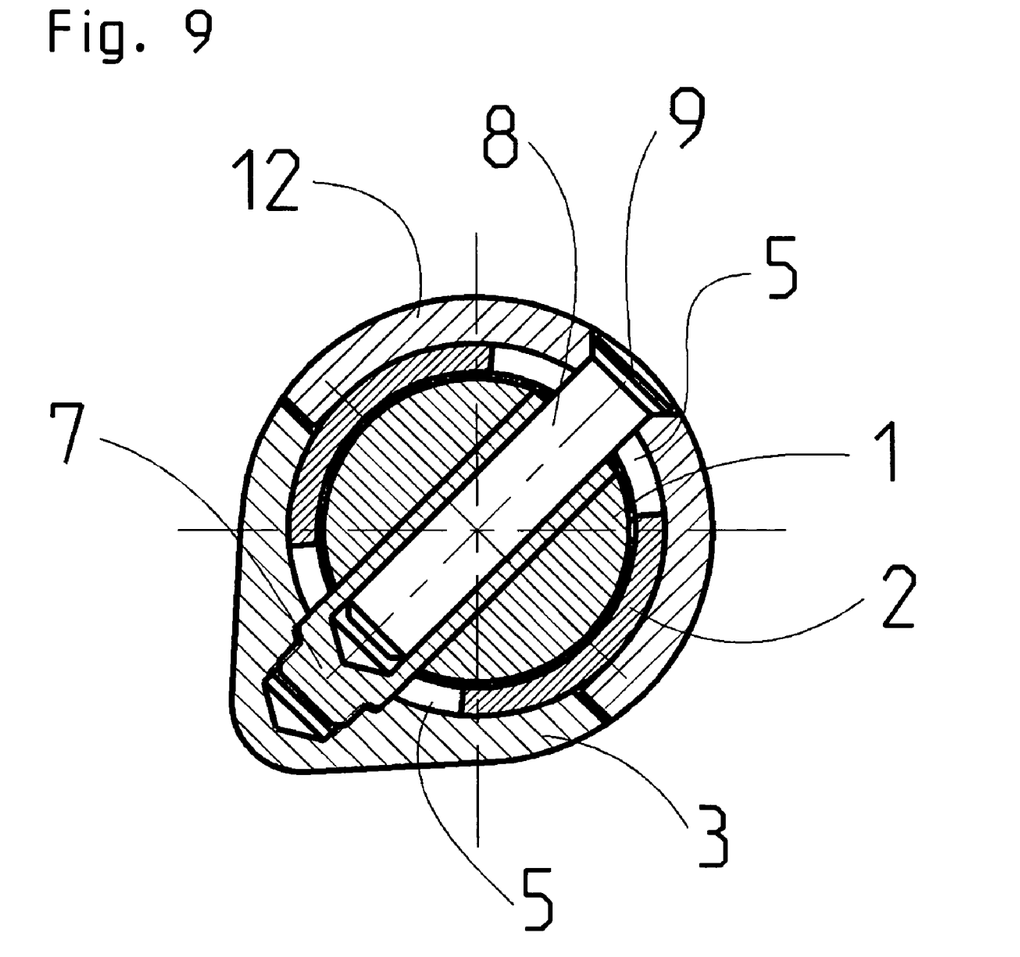

Embodiment According to FIG. 9

In this embodiment, the dowel pin 8 is supported on the supplementary cam element 12 by form-fitting contact via a stop head 9 in a cam embodiment in the manner of FIGS. 7 and 8.

Figure 10:
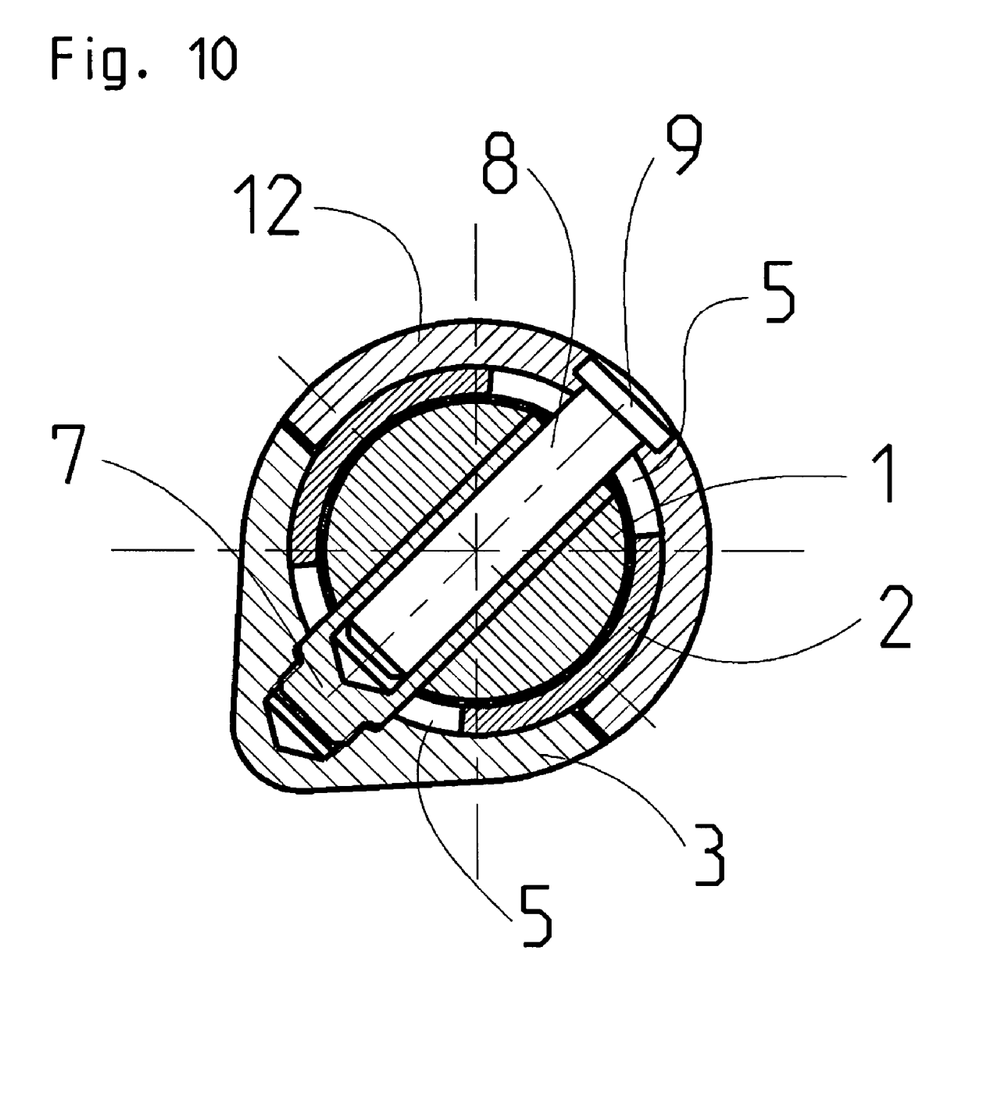

Embodiment According to FIG. 10

The only difference in comparison with the embodiment according to FIG. 9 is the different design of the stop head 9 of the dowel pin 8.

Figure 11:
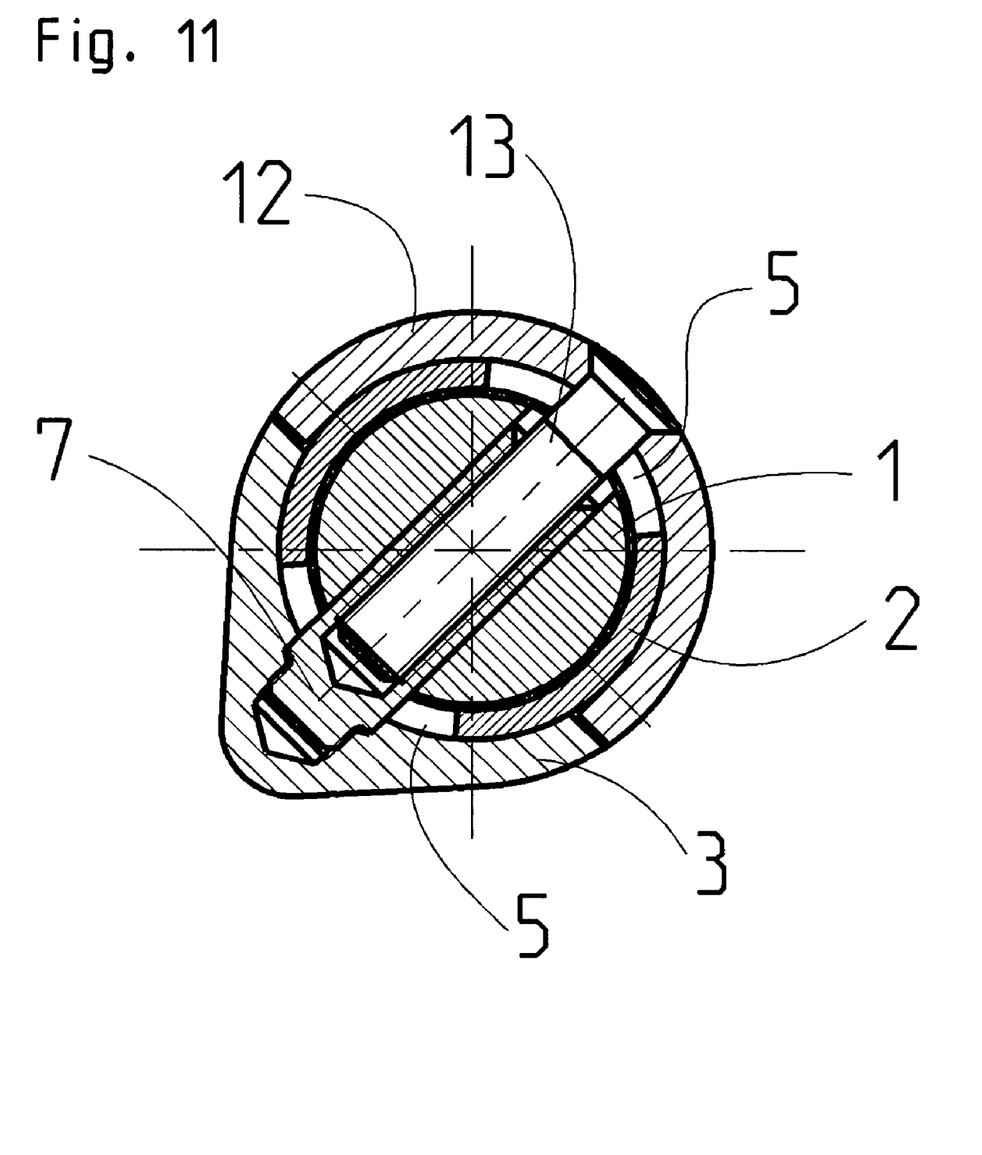

Embodiment According to FIG. 11

In this embodiment, a dowel pin 8 is screwed into the fastening means 7, with a screw head 13 of this dowel pin screw supported in a form-fitting manner on the supplementary cam element 12.

Figure 12:
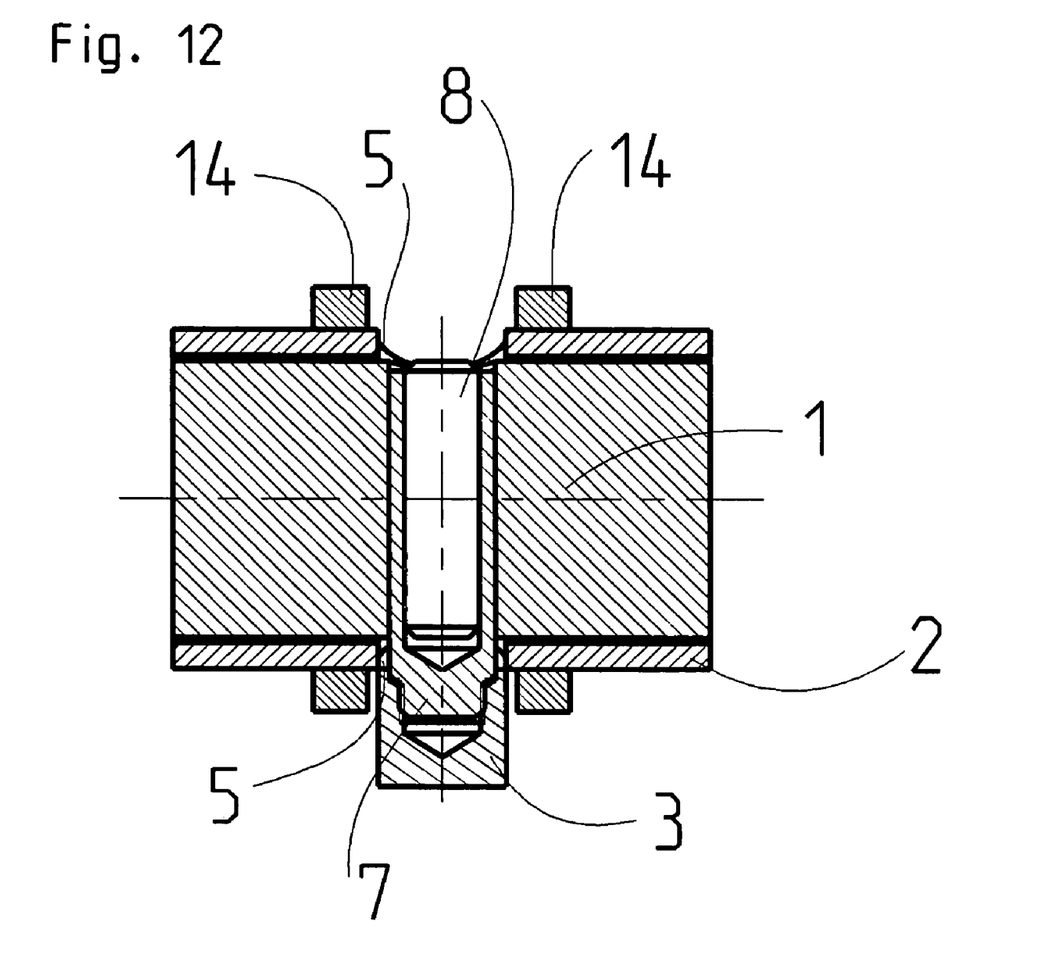

Embodiment According to FIG. 12

The main cam element 3 and its method of fastening on the inside shaft 1 correspond to those in the embodiment in FIG. 1. In addition, two rings 14 which are pushed onto the outside shaft 2 and between them enclose the main cam element 3 are additionally provided in this embodiment, thereby functionally supplementing the main cam element 3 by a base circle area.

All the features depicted in the description and in the following claims may be essential to this invention either individually or when combined together in any form.

The invention claimed is:

1. A camshaft having contrarotating cams for automotive engines in particular, in which an inside shaft (1) and an outside shaft (2) are arranged concentrically and so that they are contrarotating, at least one cam consists of at least one main cam element (3) that can be placed radially on the outside shaft (2) and is supported there so it can rotate, the main cam element (3) is connected to the inside shaft 1 at least in a manner that is rotationally locked via a cam fastening means (7) passing through a recess (5) in the outside shaft (2), comprising the features the fastening means (7) protrudes like a pin radially inward from the inside circumferential surface (4) of the main cam element (3) and has a recess that is open toward the free end and is aligned radially with the inside circumferential surface (4) of the main cam element (3) at least in its freely protruding end area, the main cam element (3) supported on the outside shaft (2) engages with its fastening means (7) in a through-hole (6) in the inside shaft (1) designed complementary in shape to the outside circumference of this fastening means (7), a locking means (8) which passes through a respective recess (5) in the outside shaft (2) projects from the side radially opposite the main cam element (3) into the recess in the fastening means (7), the fastening of the main cam element (3) to the inside shaft (1) is provided via one or more of the following embodiments, namely widening of the outside diameter of the fastening means (7) by the locking means (8) with a resulting tight fit connection between the fastening means (7) and the inside shaft (1) on the one hand and the fastening means (7) and the locking means (8) on the other hand, whereby the locking means (8) may be connected to a supplementary cam element (12), a tight fit between the locking means (8) and the fastening means (7), on the one hand, and, on the other hand, a form fit which is created radially between the inside shaft (1) and the locking means (8) through contact of the locking means (8) with the inside shaft (1) on one side radially, a tight fit between the locking means (8) and the fastening means (7) on the one hand and a form fit between the main cam element (3) and a supplementary cam element (12) which is supported on the main cam element (3) on the other side which in turn holds the locking means (8).

2. The camshaft according to claim 1, wherein the supplementary cam element (12) forms together with the main cam element (3) an adjusting cam which has a closed peripheral cam outside surface, is rotatably mounted with respect to the outside shaft (2) and is connected at least in a rotationally fixed manner to the inside shaft (1) while completely surrounding the outside shaft (2).

3. The camshaft according to claim 1, wherein the main cam element (3) contacts the inside shaft with a circumferential angle of max. 180° while its outside circumference extends over a circumferential angle going beyond this contact angle.

4. The camshaft according to claim 1, wherein two rings (14) axially adjacent to the main cam element (3) on both ends are joined onto the outside shaft (2), assuming the function of the cam base circle.

5. The camshaft according to claim 1, wherein a tight fit is provided between the locking means (8) and the fastening means (7) by means of a screw connection, to which end the locking means (8) is designed as a screw (10, 13) and the fastening means (7) is designed as a threaded bore to accommodate the screw (10, 13).

6. The camshaft according to claim 5, wherein the screw (10, 13) and the threaded bore are designed to be conical so they are complementary to one another within the fastening means (7).

7. The camshaft according to claim 6, wherein the threaded area includes only an area facing the free end of the fastening means, while the remaining area is designed to be conical but not without a thread.

8. The camshaft according to claim 7, wherein the threaded area is designed to be a circular cylinder.

9. The camshaft according to claim 1, wherein in the case of a cam element which is closed on the circumference and is made up of a main cam element (3) and a supplementary cam element (12), the assembled cam elements (3, 12) are produced by cracking a closed cam ring originally in one piece.

* * * * *